United States Patent
Takahashi et al.

(10) Patent No.: US 9,640,302 B2
(45) Date of Patent: May 2, 2017

(54) CABLE WITH MOLDED RESIN

(71) Applicant: Hitachi Metals, Ltd., Tokyo (JP)

(72) Inventors: Kazuhisa Takahashi, Hitachi (JP);
Masanori Sagawa, Kitaibaraki (JP);
Yukio Ikeda, Hitachi (JP); Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/732,532

(22) Filed: Jun. 5, 2015

(65) Prior Publication Data

US 2015/0364231 A1  Dec. 17, 2015

(30) Foreign Application Priority Data

Jun. 17, 2014  (JP) .................................. 2014-124649

(51) Int. Cl.

| H01B 7/24 | (2006.01) |
|---|---|
| G01D 11/24 | (2006.01) |
| H01R 13/58 | (2006.01) |
| H01B 3/30 | (2006.01) |
| H01B 3/42 | (2006.01) |
| H01B 3/47 | (2006.01) |

(52) U.S. Cl.
CPC ............. *H01B 7/24* (2013.01); *G01D 11/245* (2013.01); *H01B 3/305* (2013.01); *H01B 3/422* (2013.01); *H01B 3/47* (2013.01); *H01R 13/5833* (2013.01); *H01R 13/5845* (2013.01)

(58) Field of Classification Search
CPC .. H01B 7/04; H01B 7/24; H01B 3/305; F16G 13/16; H02G 4/0481
USPC ........................................................ 174/70
See application file for complete search history.

(56) References Cited

U.S. PATENT DOCUMENTS

| 5,309,539 A * | 5/1994 | Sano ..................... G02B 6/4436 385/106 |
|---|---|---|
| 2001/0010982 A1 | 8/2001 | Sakaguchi |
| 2007/0187869 A1 | 8/2007 | Bierslaker et al. |
| 2012/0318557 A1 * | 12/2012 | Iwasaki ................ C08K 5/0025 174/113 C |
| 2013/0203284 A1 | 8/2013 | Perotto et al. |
| 2014/0320113 A1 * | 10/2014 | Adachi ................... G01P 1/026 324/207.2 |

FOREIGN PATENT DOCUMENTS

JP     09-035820 A     2/1997

OTHER PUBLICATIONS

European Search Report dated Oct. 13, 2015.

* cited by examiner

*Primary Examiner* — Hoa C Nguyen
*Assistant Examiner* — Stanley Tso
(74) *Attorney, Agent, or Firm* — McGinn IP Law Group, PLLC.

(57) ABSTRACT

A cable with a molded resin includes a cable including an electric wire and a sheath covering the electric wire, the electric wire including a central conductor and an insulation covering the central conductor, and a molded resin covering a part of the electric wire protruding from the sheath in a longitudinal direction thereof, the molded resin being apart from the sheath. The electric wire is bent at not less than one bent part in the molded resin.

15 Claims, 3 Drawing Sheets

CABLE WITH MOLDED RESIN

The present application is based on Japanese patent application No. 2014-124649 filed on Jun. 17, 2014, the entire contents of which are incorporated herein by reference.

BACKGROUND OF THE INVENTION

1. Field of the Invention

The invention relates to a cable with a molded resin that a part of the cable in a longitudinal direction thereof is covered by a molded resin.

2. Description of the Related Art

A cable with a molded resin is known in which an electronic component connected to an end part of a cable is covered by a molded resin (see e.g. JP-A-H09-35820).

The cable disclosed in JP-A-H09-35820 includes a connector part to be connected to terminals of an electronic equipment, a circuit board attached to the connector part, electronic components mounted on the circuit board, a case covering the electronic components, a cable to be electrically connected to the connector part via the circuit board, and a molded resin covering the connection end part side of the cable.

The cable is a coaxial cable, and is configured such that internal conducting wires and external conducting wires exposed at the end part are respectively connected to circuit patterns formed on the circuit board. The molded resin integrally covers the connection end part, the circuit board and the electronic components in a state of being covered by the case.

SUMMARY OF THE INVENTION

The cable disclosed in JP-A-H09-35820 may have a risk that the molded resin can usually absorb a tensile force applied to the cable from outside, but a contact failure may occur at the connection parts of the internal conducting wires and external conducting wires to the circuit pattern if a strong tensile force acts thereon.

It is an object of the invention to provide a cable with a molded resin that prevents a tensile force from acting on the end part of the cable even when the tensile force is applied to the cable outside the molded resin.

According to one embodiment of the invention, a cable with a molded resin comprises:

a cable comprising an electric wire and a sheath covering the electric wire, the electric wire comprising a central conductor and an insulation covering the central conductor; and a molded resin covering a part of the electric wire protruding from the sheath in a longitudinal direction thereof, the molded resin being apart from the sheath, wherein the electric wire is bent at not less than one bent part in the molded resin.

Effects of the Invention

According to one embodiment of the invention, a cable with a molded resin can be provided that prevents a tensile force from acting on the end part of the cable even when the tensile force is applied to the cable outside the molded resin.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

A sensor module according to the first embodiment of the invention is used, for example, as a vehicle mounted sensor or the like mounted on vehicles so as to measure a rotation number of a wheel, a rotation angle of a handle and the like in vehicles. The sensor module is one aspect of the cable with a molded resin of the invention.

Figure 1:
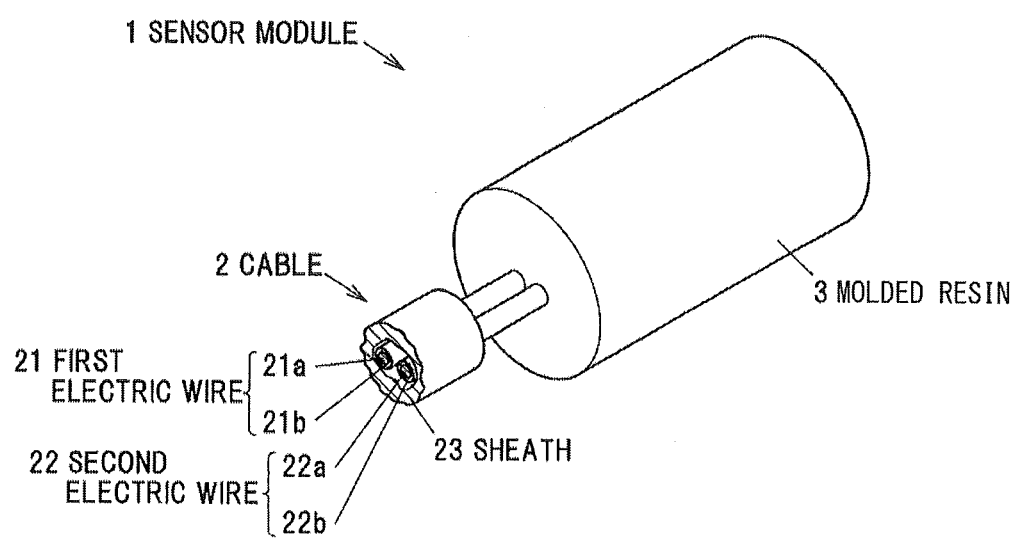
FIG. 1 is a perspective view schematically showing an appearance of a sensor module according to a first embodiment of the invention.
Figure 2A:
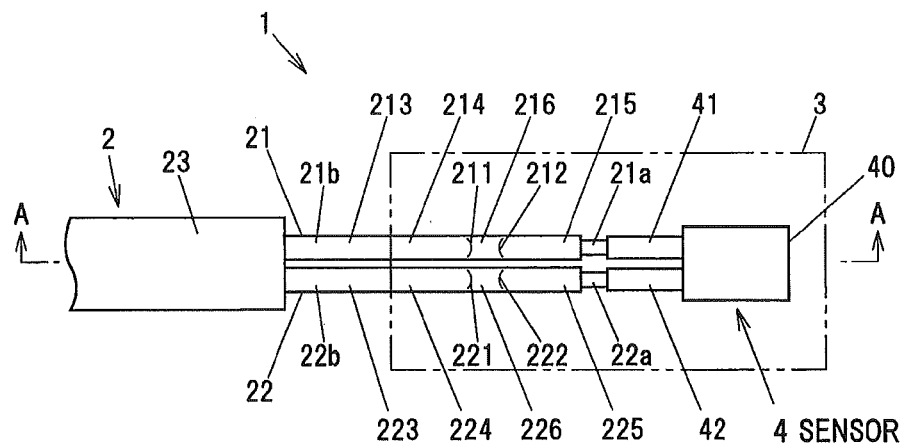
FIG. 2A is a top view schematically showing a configuration example of the sensor module according to the first embodiment of the invention.
Figure 2B:
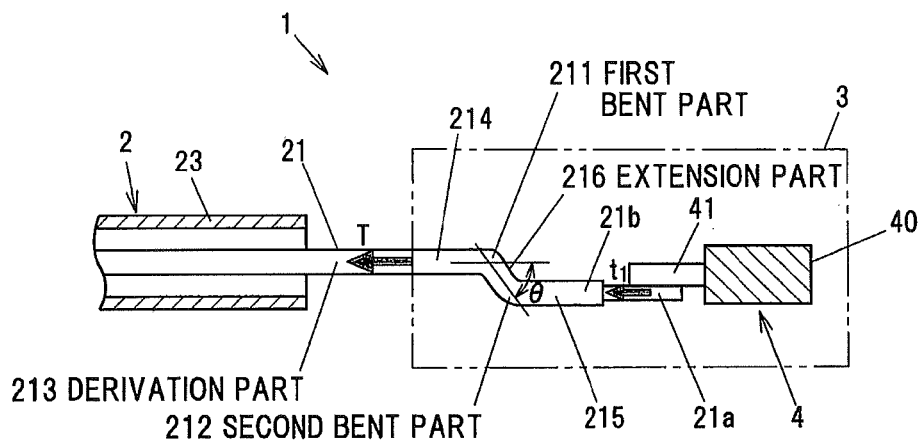
FIG. 2B is a cross-sectional view taken along the line A-A in FIG. 2A.
Figure 2C:
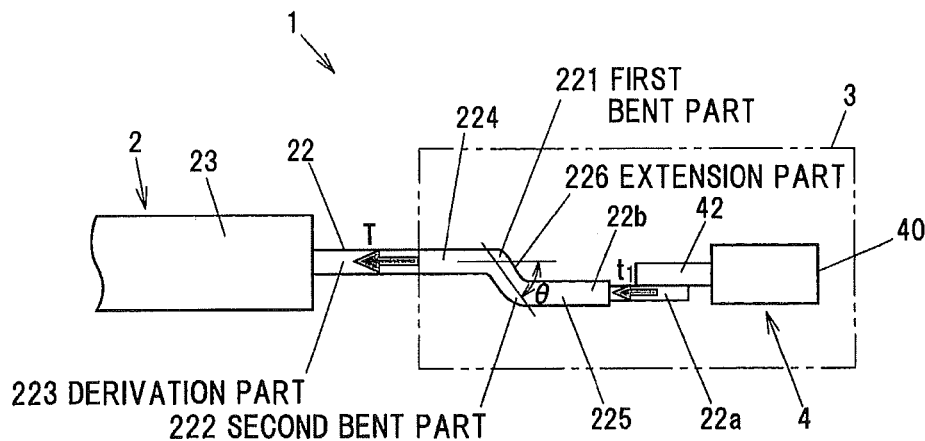
FIG. 2C is a side view schematically showing a configuration example of the sensor module according to the first embodiment of the invention.

FIG. 1 is a perspective view schematically showing an appearance of a sensor module according to a first embodiment of the invention. FIG. 2A is a top view schematically showing a configuration example of the sensor module according to the first embodiment of the invention, FIG. 2B is a cross-sectional view taken along the line A-A in FIG. 2A, and FIG. 2C is a side view schematically showing a configuration example of the sensor module according to the first embodiment of the invention. It is to be noted that FIGS. 2A to 2C show the molded resin 3 by a two-dot chain line.

The sensor module 1 includes the cable 2, the molded resin 3 molding one end part of the cable 2 in the longitudinal direction and the sensor 4 (shown in FIG. 2) connected to the dismal end part of the cable 2 in the molded resin 3.

The molded resin 3 is formed of resin materials such as nylon, polyamide and polybutylene terephthalate (PBT) and, as shown in FIG. 1, has a cylindrical shape extending in the longitudinal direction of the cable 2. The molded resin 3 may include a glass fiber in order to enhance strength thereof. The molded resin 3 is not always needed to have a cylindrical shape. For example, the molded resin 3 may have a rectangular cylindrical shape or a bombshell-like shape.

In the embodiment, the molded resin 3 is configured to mold one end part of the cable in the longitudinal direction and the whole of the sensor 4, but not limited to this, for example, the sensor 4 may be exposed to outside without being covered by the molded resin 3. Namely, the molded resin 3 is not necessarily required to mold the terminals of the cable 2, but the molded resin 3 has only to mold a part of the cable 2 in the longitudinal direction.

The sensor 4 is, for example, a hall switch including the measurement part 40 on which a Hall element or the like configured to detect magnetism are mounted, and a plurality (two in the embodiment) of the lead terminals 41, 42 disposed to one end part of the measurement part 40. It is to be noted that the sensor 4 is not limited to one configured to measure magnetism of a Hall switch, a Hall IC or the like, but the sensor 4 is needed only to be able to measure physical quantity in a state of being covered with the molded resin 3, and the sensor 4 may be one configured to measure temperature and oscillation as a target.

The cable 2 includes the first electric wire 21 including the central conductor 21a and the insulation 21b covering the central conductor 21a, the second electric wire 22 including the central conductor 22a and the insulation 22b covering the central conductor 22a, and the sheath 23 covering the first electric wire 21 and the second electric wire 22. The end of first and second electric wires 21, 22 protrudes from the sheath 23 on the side of the molded resin 3. In other words, the first and second electric wires 21, 22 are configured such that a partial region including the end part, of the protruding part from the sheath 23 is covered with the molded resin 3.

As shown in FIGS. 2A and 2B, at the end part of the first electric wire 21 in the molded resin 3, the central conductor 21a exposed from the insulation 21b is connected to one lead terminal 41 of the sensor 4, for example, by soldering. Similarly, at the end part of the second electric wire 22 in the molded resin 3, the central conductor 22a exposed from the insulation 22b is connected to another lead terminal 42 of the sensor 4.

In the embodiment, in order to enhance flexibility in the end part of the sensor module 1 (namely, in order to allow the molded resin 3 to be easily swinged and bent relative to the cable 2), the molded resin 3 is configured to mold the sensor 4 and a part, which protrudes from the sheath 23, of the first and second electric wires 21, 22 on the side of the end part while being apart from the sheath 23. Thus, of the first and second electric wires 21, 22 protruding from the sheath 23, the remaining part without being covered by the molded resin 3 is exposed.

As described above, the molded resin 3 is disposed apart from the sheath 23 while contacting with the part with a smaller diameter than the sheath 23, of the first and second electric wires 21, 22 on the side of the end part. Thus it becomes possible to easily swing and bend the molded resin 3 relative to the cable 2.

As described above, the molded resin 3 is disposed apart from the sheath 23 while contacting with the part with the smaller diameter than the sheath 23, of the first and second electric wires 21, 22 on the side of the end part. In this case, the surface area of the cable 2 contacting with the molded resin 3 is reduced comparing to the case that the molded resin 3 is also provided on the sheath 23. Thus, when a tensile force is applied to the cable 2, more force can act on the end part of the cable 2 in the molded resin 3.

In the embodiment, as shown in FIG. 2B, therefore, the first electric wire 21 is bent at the first and second bent parts 211, 212 in the molded resin 3. More specifically, the first electric wire 21 includes, other than the first and second bent parts 211, 212, the derivation part 213 derived from the molded resin 3, the first extending part 214 extending from the derivation part 213 to the first bent part 211, the second extending part 215 extending from the second bent part 212 to the side of the sensor 4, and the extension part 216 connecting between the first and second bent parts 211, 212.

As shown in FIG. 2C, similarly to the first electric wire 21, the second electric wire 22 is bent at the first and second bent parts 221, 222 in the molded resin 3, and the second electric wire 22 includes, other than the first and second bent parts 221, 222, the derivation part 223, the first and second extending parts 224, 225 and the extension part 226.

The first and second extension parts 216, 226 in the first and second electric wires 21, 22 are respectively located in the molded resin 3 via the first bent part 211, 221 and the first extending part 214, 224 between the derivation part 213, 223 so as to extend in a direction intersected with respect to the derivation direction of the derivation part 213, 223. Further, it is preferable that the extension part 216, 226 extends in a direction intersected at the angle of 45 to 90 degrees with respect to the derivation direction of the derivation part 213, 223. Namely, it is preferable that the angle θ in the FIGS. 2B and 2C is 45 to 90 degrees.

Here, the "derivation direction" means a derived direction of the first and second electric wires 21, 22 from the end part of the molded resin 3. For example, the derivation direction is different from a bent direction in a case that the derivation part 213, 216 is bent according to the use mode of the sensor module 1.

In the embodiment, the first electric wire 21 is bent at two positions of the first and second bent parts 211, 212, and the second electric wire 22 is bent at two positions of the first and second bent parts 221, 222, but not limited to this, the first and second electric wires 21, 22 are needed only to be bent at at least one bent part in the molded resin 3.

In the cable 2, when a tensile force T from outside in the derivation direction is applied to the first and second electric wires 21, 22 exposed from the molded resin 3, a part of the tensile force transmitted is dispersed in the extension part 216, 226 in the extension direction (a direction intersected with the derivation direction). The size of the force transmitted to the extension part 216, 226 while being dispersed is reduced according to the angle θ.

The first and second electric wires 21, 22 are arranged apart from each other in the section where they are covered by the molded resin 3. Thereby, the molded resin 3 can penetrate between the first and second electric wires 21, 22 so as to cover the whole of the first and second electric wires 21, 22 in the circumferential direction. Thus, the contact area between the first and second electric wires 21, 22 and the molded resin 3 can be further increased.

(Action and Effect of First Embodiment)

According to the first embodiment explained above, the following action and effect can be obtained.

(1) The cable 2 (the first and second electric wires 21, 22) is bent at the first bent part 211, 221 and the second bent part 212, 221 in the molded resin 3, thus even if a tensile force is applied to the cable 2 from outside in the derivation direction, the tensile force acting on the side of the dismal end part of the cable 2 is reduced via the first bent part 211, 221 and the second bent part 212, 221. Thereby, the tensile force respectively acting on the connection part between the central conductor 21a of the first electric wire 21 and the lead terminal 41 of the sensor 4, and the connection part between the central conductor 22a of the second electric wire 22 and the lead terminal 42 of the sensor 4 is reduced, while the molded resin 3 can be easily swinged and bent relative to the cable 2.

(2) The extension part 216, 226 extending in a direction intersected with respect to the derivation direction of the derivation part 213, 223 is located in the molded resin 3 via the first bent part 211, 221 between the derivation part 213, 223, thus the tensile force applied to the cable 2 from outside in the derivation direction is received by the whole of the extension part 216, 226, thereby the tensile force acting on the connection part between the central conductor 21a of the first electric wire 21 and the lead terminal 41 of the sensor 4, and the connection part between the central conductor 22a of the second electric wire 22 and the lead terminal 42 of the sensor 4 is further reduced.

Second Embodiment

Next, the second embodiment according to the invention will be explained referring to FIG. 3.

Figure 3A:
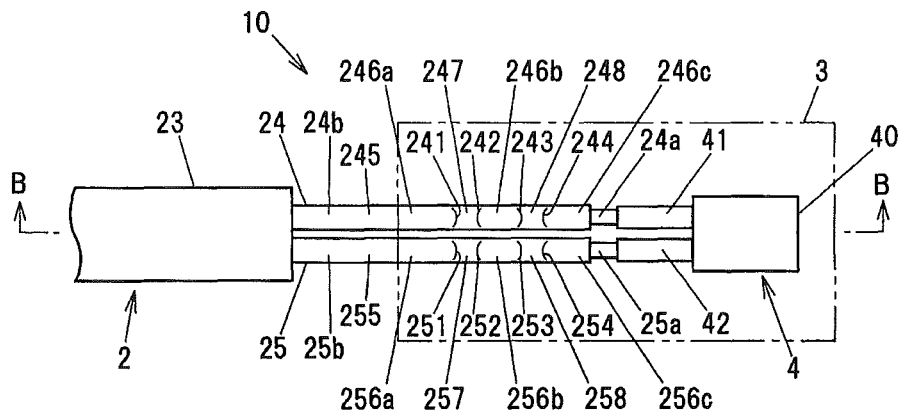
FIG. 3A is a top view schematically showing a configuration example of the sensor module according to a second embodiment of the invention.
Figure 3B:
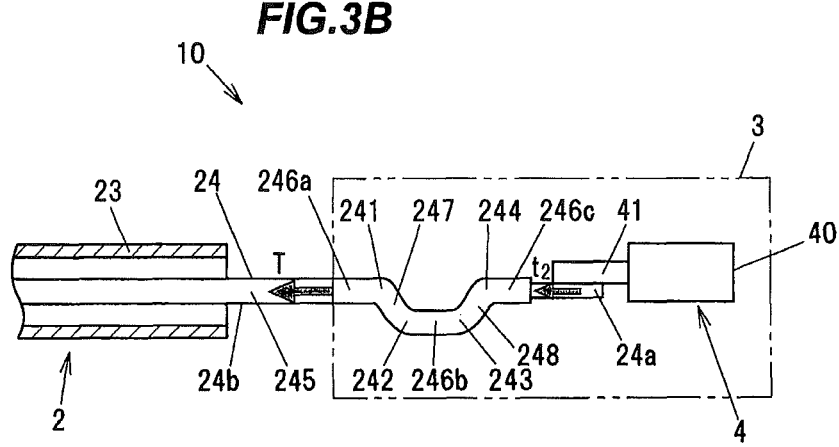
FIG. 3B is a cross-sectional view taken along the line B-B in FIG. 3A.
Figure 3C:
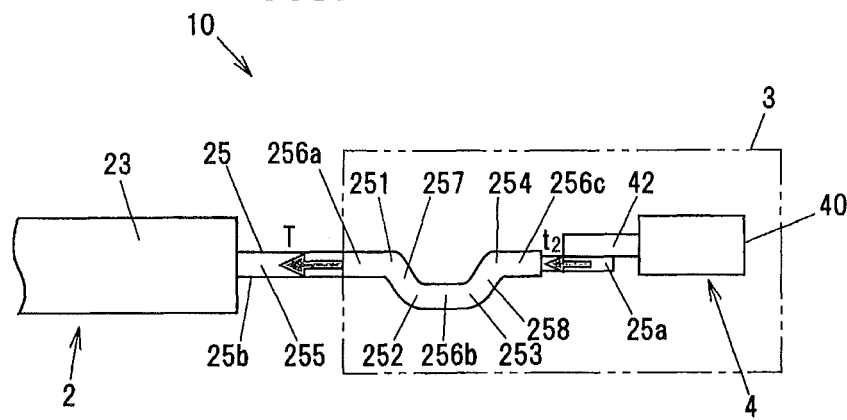
FIG. 3C is a side view schematically showing a configuration example of the sensor module according to the second embodiment of the invention.

FIG. 3A is a top view schematically showing a configuration example of the sensor module according to a second embodiment of the invention, FIG. 3B is a cross-sectional view taken along the line B-B in FIG. 3A and FIG. 3C is a side view schematically showing a configuration example of the sensor module according to the second embodiment of the invention. It is to be noted that FIGS. 3A to 3C show the molded resin 3 by a two-dot chain line.

In FIGS. 3A to 3C, with regard to the same constituent elements as those explained in the sensor module 1 according to the first embodiment, the same reference signs will be used, and the explanation will be omitted.

The sensor module 10 according to the embodiment includes the cable 2 including the first electric wire 24 including the central conductor 24a and the insulation 24b covering the central conductor 24a, the second electric wire 25 including the central conductor 25a and the insulation 25b covering the central conductor 25a, and the sheath 23 covering the first electric wire 24 and the second electric wire 25; the molded resin 3 molding one end part of the cable 2 in the longitudinal direction; and the sensor 4 connected to the dismal end part of the cable 2 in the molded resin 3.

The sensor module 10 is different in the structure of the first and second electric wires 24, 25 in the molded resin 3, from the structure of the first and second electric wires 21, 22 in the molded resin 3 of the sensor module 1 according to the first embodiment.

As shown in FIG. 3B, the first electric wire 24 meanders in the molded resin 3 so as to be bent at the first to fourth bent parts 241 to 244.

More specifically, the first electric wire 24 includes, other than the first to fourth bent parts 241 to 244, the derivation part 245 derived from the molded resin 3, the first extending part 246a extending from the derivation part 245 to the first bent part 241, the second extending part 246b extending between the second and third bent parts 242, 243, the third extending part 246c extending from the fourth bent part 244 to the side of the sensor 4, the first extension part 247 connecting between the first and second bent parts 241, 242 and the second extension part 248 connecting between the third and fourth bent parts 243, 244.

The first and second extension parts 247, 248 extend in a direction intersected with respect to the derivation direction of the derivation part 245. In the embodiment, the intersection direction of the first extension part 247 and the intersection direction of the second extension part 248 are symmetrical with respect to the derivation direction of the derivation part 245. Namely, the intersection direction of the first extension part 247 and the intersection direction of the second extension part 248 are intersected with each other.

The first extension part 247 is located in the molded resin 3 via the first bent part 241 and the first extending part 246a between the derivation part 245, and the second extension part 248 is located in the molded resin 3 via the first to third bent parts 241 to 243, the first extension part 247, and the first and second extending parts 246a, 246b between the derivation part 245.

As described above, the first electric wire 24 meanders so as to be bent at the first to fourth bent parts 241 to 244, thereby the first extending part 246a and the third extending part 246c are located so as to be aligned along the extending direction. In the embodiment, the first to the third extending parts 246a, 246b, 246c extend in a direction parallel to each other, thus the third extending part 246c is located on the extension of the extending direction of the first extending part 246a.

As shown in FIG. 3C, similarly to the first electric wire 24, the second electric wire 25 meanders so as to be bent at the first to fourth bent parts 251 to 254 in the molded resin 3.

More specifically, the second electric wire 25 includes, other than the first to fourth bent parts 251 to 254, the derivation part 255 derived from the molded resin 3, the first extending part 256a extending from the derivation part 255 to the first bent part 251, the second extending part 256b extending between the second and third bent parts 252, 253, the third extending part 256c extending from the fourth bent part 254 to the side of the sensor 4, the first extension part 257 connecting between the first and second bent parts 251, 252 and the second extension part 258 connecting between the third and fourth bent parts 253, 254.

The first and second extension parts 257, 258 extend in a direction intersected with respect to the derivation direction of the derivation part 255, similarly to the first and second extension parts 247, 248 of the first electric wire 24. The intersection direction of the first extension part 257 with respect to the derivation direction of the derivation part 255 is intersected with the intersection direction of the second extension part 258 with respect to the derivation direction of the derivation part 255.

The first extension part 257 is located in the molded resin 3 via the first bent part 251 and the first extending part 256a between the derivation part 255, and the second extension part 258 is located in the molded resin 3 via the first to third bent parts 251 to 253, the first extension part 257, and the first and second extending parts 256a, 256b between the derivation part 255. In addition, the third extending part 256c is located on the extension of the extending direction of the first extending part 256a.

In the embodiment, the first electric wire 24 meanders so as to be bent at four positions of the first to fourth bent parts 241 to 244, and the second electric wire 25 meanders so as to be bent at four positions of the first to fourth bent parts 251 to 254, but the number of the bent part is not particularly limited. The first and second electric wires 24, 25 may be respectively bent in an arc shape between the first bent part 241, 251 and the fourth bent part 244, 254.

In the cable 2, when a tensile force T from outside in the derivation direction is applied to the first and second electric wires 24, 25 exposed from the molded resin 3, a part of the tensile force transmitted is dispersed in the first extension part 247, 257 and the second extension part 248, 258 in the extension direction (a direction intersected with the derivation direction).

(Action and Effect of Second Embodiment)

According to the second embodiment explained above, the same action and effect as those of (1) and (2) of the first embodiment can be also obtained. In addition, the first electric wire 24 meanders so as to be bent at the first to fourth bent parts 241 to 244, and the second electric wire 25 meanders so as to be bent at the first to fourth bent parts 251 to 254, thus the sensor module 10 can be prevented from being increased in size as a whole (specifically in the thickness of the molded resin 3), while the sensor module 10 makes it possible to include a plurality of the extension parts.

Summary of Embodiments

Next, technical ideas grasped from the above-mentioned embodiments will be described referring to reference signs and the like in the embodiments. It is to be noted that, however, each of the reference signs and the like in the following description does not limit the constituent elements in the scope of claims to members and the like shown in the embodiments specifically.

[1] The cable with a molded resin (the sensor module 1, 10), including the cable (2) including at least one electric wire (21, 22/24, 25) and a sheath (23) covering the electric wire (21, 22/24, 25), the electric wire (21, 22/24, 25) comprising the central conductor (21*a*, 22*a*/24*a*, 25*a*) and the insulation (21*b*, 22*b*/24*b*, 25*b*) covering the central conductor (21*a*, 22*a*/24*a*, 25*a*), and the molded resin (3) covering a part of the electric wire (21, 22/24, 25) in the longitudinal direction and disposed apart from the sheath (23), the electric wire (21, 22/24, 25) protruding from the sheath (23), wherein the electric wire (21, 22/24, 25) is bent at not less than one bent part (the first bent part 211, 221 and the second bent part 212, 222/the first to fourth bent parts 241 to 244, 251 to 254) in the molded resin (3).

[2] The cable with a molded resin (the sensor module 1, 10) according to [1], wherein the electric wire (21, 22/24, 25) comprises the derivation part (213, 223/245, 255) derived from the molded resin (3) and the extension part (216, 226/the first extension part 247, 257 and the second extension part 257, 258) extending in a direction intersected with respect to the derivation direction of the derivation part (213, 223/245, 255), wherein the extension part (216, 226/the first extension part 247, 257 and the second extension part 257, 258) is located in the molded resin (3) via the bent part (the first bent part 211, 221/241, 251) between the derivation part (213, 223/245, 255).

[3] The cable with a molded resin (the sensor module 1, 10) according to [2], wherein the extension part (216, 226/the first extension part 247, 257 and the second extension part 257, 258) extends in a direction intersected at the angle of 45 to 90 degrees with respect to the derivation direction.

[4] The cable with a molded resin (the sensor module 10) according to [1], wherein the electric wire (21, 22/24, 25) meanders in the molded resin (3) so as to be bent at a plurality of the bent parts (the first to fourth bent parts 241 to 244, 251 to 254).

[5] The cable with a molded resin (the sensor module 1, 10) according to [1], further comprising the sensor (4) connected to an end part of the electric wire (21, 22/24, 25) in the molded resin (3).

[6] The cable with a molded resin (the sensor module 1, 10) according to [5], wherein the sensor (4) comprises the measurement part (40) with the element (a Hall element or the like) to detect magnetism mounted thereon and the lead terminal (41, 42) disposed at the measurement part (40) and wherein the central conductor (21*a*, 22*a*/24*a*, 25*a*) is connected to the lead terminal.

[7] The cable with a molded resin (the sensor module 1, 10) according to [1], wherein the molded resin (3) comprises at least one of nylon, polyamide and polybutylene terephthalate (PBT).

[8] The cable with a molded resin (the sensor module 1, 10) according to [7], wherein the molded resin (3) further comprises a glass fiber.

[9] The cable with a molded resin (the sensor module 1, 10) according to [1], wherein the cable (2) comprises a plurality of the electric wires (21, 22/24, 25), and wherein the plurality of the electric wires (21, 22/24, 25) are arranged apart from each other in the molded resin (3).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, in the above-mentioned embodiments, the cable 2 has been configured to include the first and second electric wires 21, 22 and the sheath 23 covering the first and second electric wires 21, 22, the first and second electric wires 21, 22 including the central conductor 21*a*, 22*a* and the insulation 21*b*, 22*b*, but not limited to this, for example, the cable 2 may be a cable comprised of conductors and a sheath without including an insulation or the like, or a cable configured such that not less than 3 electric wires are covered with a sheath. Namely, a cable according to the purpose of use of the sensor module 1, 10 can be applied.

In addition, in the above-mentioned embodiments, the sensor module 1, 10 has been explained as one aspect of the cable with the molded resin, but not limited to this, for example, the cable with the molded resin can be applied to connectors and the like by connecting terminals to the dismal end of the cable.

What is claimed is:

1. A cable with a molded resin, comprising:
    a cable comprising electric wires and a sheath covering the electric-wires, each electric wire comprising a central conductor and an insulation covering the central conductor;
    a molded resin covering parallel portions of the electric wires protruding from the sheath in a longitudinal direction thereof, the molded resin being apart from the sheath; and
    a sensor connected to an end part of the electric wires in the molded resin,
    wherein the sensor comprises a measurement part with an element to detect magnetism mounted thereon and a lead terminal disposed at the measurement part,
    wherein the central conductor is connected to the lead terminal,
    wherein the electric wires are bent at the parallel portions in the molded resin,
    wherein said each electric wire meanders within the molded resin so as to be bent at three or more bent parts,
    wherein each bent part is disposed within the molded resin,
    wherein each said bent part is bent at an angle of 45 degrees to 90 degrees,
    wherein said each electric wire comprises a derivation part derived from the molded resin and an extension part extending in a direction intersected with a derivation direction of the derivation part,
    wherein the electric wires are parallel with each other along an entire length within the molded resin, and
    wherein each said electric wire includes an exposed wire segment portion disposed between said sheath and said molded resin.

2. The cable according to claim 1,
    wherein the extension part is disposed in the molded resin such that a bent part falls between the derivation part and the extension part.

3. The cable according to claim 2, wherein the extension part extends in a direction intersected at an angle of 45 degrees to 90 degrees with the derivation direction.

4. The cable according to claim 1, wherein the molded resin comprises one of nylon, polyamide and polybutylene terephthalate (PBT).

5. The cable according to claim 4, wherein the molded resin further comprises a glass fiber.

6. The cable according to claim 1, wherein the electric wires are arranged apart from each other in the molded resin.

7. The cable according to claim 1, wherein the electric wires are arranged apart from each other in the molded resin.

8. The cable according to claim 1, wherein the molded resin covers the insulation and the central conductor exposed from the insulation.

9. The cable according to claim 1, wherein the molded resin covers the insulation and the central conductor exposed from the insulation in a part of the electric wires protruding from the sheath.

10. The cable according to claim 1, wherein a distal end of said each electric wire extends in parallel with a derivation direction of said each electric wire derived from the molded resin.

11. The cable according to claim 10, wherein said each electric wire comprises a derivation part derived from the molded resin in the derivation direction, and an extension part extending in a direction intersected with the derivation direction of the derivation part.

12. The cable according to claim 1, further comprising a sensor connected to the electric wires, the sensor being exposed to outside without being covered by the molded resin.

13. The cable according to claim 1, wherein, in a side view of the cable, an entirety of one of the electric wires overlaps with an entirety of another one of the electric wires.

14. The cable according to claim 1, wherein the electric wires are bent at bent portions that are arranged in parallel with each other when viewed from a first direction, and are bent when viewed from a second direction orthogonal to the first direction.

15. The cable according to claim 14, wherein the first direction includes a top view of the cable, and the second direction includes a side view of the cable.

* * * * *